United States Patent Office 3,637,737
Patented Jan. 25, 1972

3,637,737
3-AMINOMETHYLPYRAZOLINONES
Bernard Loev, Broomall, Pa., assignor to Smith Kline & French Laboratories, Philadelphia, Pa.
No Drawing. Filed Jan. 24, 1969, Ser. No. 793,890
Int. Cl. C07d *49/14*
U.S. Cl. 260—310 A
2 Claims

ABSTRACT OF THE DISCLOSURE 3-aminomethylpyrazoles having anti-hypertensive activity are prepared from the reaction of a lower alkyl aminoacetoacetate with a hydrazine.

---

This invention relates to new 3-aminomethylpyrazoles having pharmacodynamic activity, in particular having anti-hypertensive activity as demonstrated, for example, by administration to metacorticoid hypertensive rats at doses of about 45–50 mg./kg. orally.

The 3-aminomethylpyrazoles of this invention are represented by the following formulas:

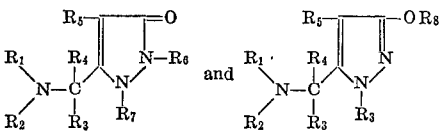

in which:

$R_1$ and $R_2$ are hydrogen or lower alkyl or, when $R_1$ is hydrogen or lower alkyl, $R_2$ is lower alkanoyl, benzoyl, lower alkoxycarbonyl or

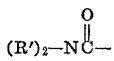

or, when taken together with the nitrogen atom to which they are attached, $R_1$ and $R_2$ are N-pyrrolidinyl, N-piperidyl or N-morpholinyl;

$R_3$, $R_4$, $R_5$, $R_6$ and $R'$ are hydrogen or lower alkyl; and $R_7$ and $R_8$ are hydrogen, lower alkyl or lower alkanoyl and nontoxic, pharmaceutically acceptable, acid addition salts thereof.

The compounds of this invention in which $R_6$ and $R_8$ are hydrogen may exist in the 5-keto form (Formula I) or the 5-hydroxy form (Formula II).

Advantageous compounds of this invention are represented by Formulas I and II hereabove in which:

$R_1$ and $R_2$ are hydrogen or methyl;
$R_3$, $R_4$ and $R_5$ are hydrogen; and
$R_6$, $R_7$ and $R_8$ are hydrogen or methyl.

Preferred compounds of this invention are represented by Formulas I and II hereabove in which each of $R_1$ to $R_8$ represents hydrogen, said compounds being 3-aminomethylpyrazolin-5-one (or 3-aminomethyl-5 - hydroxypyrazole) and nontoxic, pharmaceutically acceptable, acid addition salts thereof.

The compounds of this invention are prepared as described herebelow.

FORMULA III

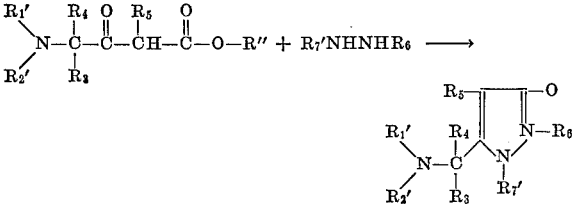

When $R_6$ is hydrogen the pyrazolinones of Formula III may exist as hydroxypyrazoles of the formula:

FORMULA IV

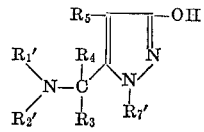

In Formulas III and IV the terms $R_3$ to $R_6$ are as defined above;

$R_1'$ an $R_2'$ are $R_1$ and $R_2$ as defined hereabove except that both are not hydrogen and, when taken together with the nitrogen atom to which they are attached, may be phthalimido;

$R_7'$ is hydrogen or lower alkyl; and $R''$ is lower alkyl.

According to the above procedure a lower alkyl aminoacetoacetate is reacted with a hydrazine. The reaction is conveniently carried out in an organic solvent, for example a lower alkanol such as ethanol, at about room temperature.

To prepare the compounds of Formulas I and II in which $R_1$ and $R_2$ are hydrogen, the phthalimidomethyl compounds of Formulas III and IV, i.e. the compounds in which $R_1'$ and $R_2'$, when taken together with the nitrogen atom to which they are attached, are phthalimido, prepared as described above, are hydrolyzed either with base, for example hydrazine, or with acid, for example hydrochloric acid.

The compounds of Formula II in which $R_8$ is lower alkyl are prepared by reacting a compound of Formula III (in which $R_6$ is hydrogen) or Formula IV with a lower alkyl halide in the presence of base such as pyridine, or by condensation with an aldehyde to form an imine (Schiff base) followed by reduction, for example, by sodium borohydride or hydrogen with a noble metal catalyst and, when $R_1'$ and $R_2'$, when taken together with the nitrogen atom to which they are attached, are phthalimido, hydrolyzing.

The compounds of Formula II in which $R_7$ and/or $R_8$ are lower alkanoyl are prepared by reacting a compound of Formula III or IV (in which $R_6$ and/or $R_7'$ are hydrogen) with a lower alkanoyl halide or a lower alkanoic acid anhydride in the presence of base such as pyridine to prepare the compounds in which $R_8$ is lower alkanoyl and without base to prepare the compounds in which $R_7$ is lower alkanoyl and when $R_1'$ and $R_2'$, when taken together with the nitrogen atom to which they are attached, are phthalimido, hydrolyzing.

The compounds of Formulas I and II in which $R_1$ is hydrogen and $R_2$ is lower alkyl are preferably prepared by the above described procedure using a lower alkyl N-lower alkyl-N-acetylaminomethylacetoacetate as a starting material and removing the acetyl from the resulting N-lower alkyl-N-acetyl-aminomethylpyrazole by alkaline hydrolysis for example using ethanolic sodium hydroxide.

The nontoxic, pharmaceutically acceptable, acid addition salts of the compounds of Formulas I and II are formed with organic and inorganic acids by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric, and nitric acids. Of course, these salts may also be prepared by the classical method of double decomposition of appropriate salts which is well-known to the art.

The lower alkyl aminoacetoacetate starting materials in the preparation of the compounds of this invention are either known to the art or are prepared by reacting a lower alkyl 4-chloroacetoacetate with an appropriate amine. The reaction is carried out using an excess of the amine or in the presence of a base such as pyridine, preferably in an inert organic solvent such as benzene or toluene.

The compounds of Formulas I and II may be administered internally in conventional dosage forms by incorporating an appropriate dose of the compound with pharmaceutical carriers according to accepted pharmaceutical practices.

The terms "lower alkyl," "lower alkoxy" and "lower alkanoyl" where used herein denote groups having 1–4 carbon atoms.

The following examples are not limiting but are illustrative of the compounds of this invention and procedures for their preparation. The compounds in the following examples designated as pyrazolin-5-ones may exist, when $R_6$ is hydrogen, as indicated hereabove, as 5-hydroxypyrazoles.

EXAMPLE 1

A suspension of 27.5 g. of ethyl phthalimidoacetoacetate in 500 ml. of ethanol is stirred at 25° C. with 3.2 ml. of 97% hydrazine for 18 hours. The solid material is filtered off and washed with ether to give 3-phthalimidomethylpyrazolin-5-one.

Five grams of 3-phthalimidomethylpyrazolin-5-one in 75 ml. of 20% hydrochloric acid is refluxed for three hours. The mixture is then cooled and filtered. The filtrate is evaporated to dryness under reduced pressure. The residue is recrystallized from methanol-isopropyl ether to give 3-aminomethylpyrazolin-5-one dihydrochloride.

The salt is dissolved in methanol and treated with two equivalents of sodium methoxide dissolved in methanol. The mixture is filtered and the filtrate is evaporated to dryness under reduced pressure. The residue is recrystallized from ethyl acetate-hexane to give 3-aminomethylpyrazolin-5-one.

This free base is dissolved in isopropanol saturated with hydrogen bromide. Ether is added and the mixture is chilled and filtered to give 3-aminomethylpyrazolin-5-one dihydrobromide.

EXAMPLE 2

A suspension of 27.5 g. of ethyl phthalimidoacetoacetate in 500 ml. of ethanol is stirred with 4.6 g. of methylhydrazine at 25° C. for 18 hours. The solid material is filtered off and washed with ether to give a mixture of 1-methyl-3-phthalimidomethylpyrazolin-5-one and 2-methyl-3-phthalimidomethylpyrazolin-5-one.

The above prepared pyrazolin-5-ones (22.9 g.), 3.2 g. of hydrazine (as the hydrate, 85%) and 100 ml. of ethanol are heated at reflux with stirring for three hours. The hot solution is filtered and the filtrate is evaporated to dryness in vacuo. The residue is suspended in water. The aqueous suspension is stirred with dilute hydrochloric acid and then filtered. The filtrate is evaporated to dryness in vacuo and the residue is recrystallized from methanol-isopropyl ether to give 3-aminomethyl-1-methylpyrazolin-5-one dihydrochloride and 3-aminomethyl-2-methylpyrazolin-5-one dihydrochloride. These isomers are separated by fractional crystallization from isopropanol.

The above prepared dihydrochloride salts in methanol are treated with sodium methoxide in methanol by the procedure of Example 1 to give 3-aminomethyl-1-methylpyrazolin-5-one and 3-aminomethyl-2-methylpyrazolin-5-one.

By the same procedure using in place of methylhydrazine the following:

propylhydrazine
butylhydrazine
1,2-dimethylhydrazine
1,2-diethylhydrazine
1,2-dibutylhydrazine the dihydrochloride salts of the following compounds are obtained:

3-aminomethyl-1-propylpyrazolin-5-one
and 3-aminomethyl-2-propylpyrazolin-5-one
3-aminomethyl-1-butylpyrazolin-5-one
and 3-aminomethyl-2-butylprazolin-5-one
3-aminomethyl-1,2-dimethylpyrazolin-5-one
3-aminomethyl-1,2-diethylpyrazolin-5-one
3-aminomethyl-1,2-dibutylpyrazolin-5-one.

The above prepared dihydrochloride salts are converted to the free bases by treating with sodium methoxide in methanol according to the procedure described in Example 1.

EXAMPLE 3

A mixture of 17.3 g. of ethyl 4-dimethylamino acetoacetate, 3.2 g. of hydrazine and 500 ml. of ethanol is stirred at room temperature for 24 hours. Filtering, then washing the solid material with ether gives 3-dimethylaminomethylpyrazolin-5-one.

Similarly, using 18.7 g. of ethyl 4-dimethylamino-2-methylacetoacetate in the above procedure, 3-dimethylaminomethyl-4-methylpyrazolin-5-one is obtained.

By the same procedure, using 20.1 g. of ethyl 4-diethylaminoacetoacetate, the product is 3-diethylaminomethylpyrazolin-5-one.

EXAMPLE 4

A mixture of 21.5 g. of 3-phthalimidomethylpyrazolin-5-one (prepared as in Example 1), 10.2 g. of acetic anhydride and 100 ml. of pyridine is stirred at 25° C. for 20 minutes to give, after adding a large volume of ice water and filtering, 2-acetyl-3-phthalimidomethylpyrazolin-5-one.

A mixture of 10 g. of 2-acetyl-3-phthalimidomethylpyrazolin-5-one and 150 ml. of 20% hydrochloric acid is heated at reflux for three hours. Cooling, filtering, evaporating the filtrate to dryness in vacuo and recrystallizing the residue from methanol-isopropyl ether gives 2-acetyl-3-aminomethylpyrazolin-5-one dihydrochloride.

By the same procedure, using 10.6 g. of butyryl chloride, 3 - aminomethyl-2-butyrylpyrazolin-5-one dihydrochloride is obtained.

The above prepared dihydrochloride salts are converted to the free bases, 2-acetyl-3-aminomethylpyrazolin-5-one and 3-aminomethyl-2-butyrylpyrazolin-5-one, by the procedure described in Example 1.

EXAMPLE 5

3-phthalimidomethylpyrazolin-5-one (4.8 g.), prepared as in Example 1, dissolved in tetrahydrofuran, is treated with 1.08 g. of sodium methoxide in 5 ml. of methanol at room temperature with stirring to give the sodium salt of 3-phthalimidomethylpyrazolin-5-one.

The above prepared sodium salt is treated with 2.6 g. of acetic anhydride in 10 ml. of tetrahydrofuran at 15° C. for four hours to give, after diluting with water and filtering, 5-acetoxy-3-phthalimidomethylpyrazole.

Heating the above prepared 5-acetoxy-3-phthalimidomethylpyrazole with 20 ml. of 20% hydrochloric acid at reflux for three hours, then cooling, filtering, evaporating the filtrate to dryness in vacuo and recrystallizing the residue from methanol-isopropyl ether gives 5-acetoxy-3-aminomethylpyrazole dihydrochloride.

Similarly, treating the sodium salt of 3-phthalimidomethylpyrazolin-5-one with butyryl chloride and treating the resulting 5-butyryloxy-3-phthalimidomethylpyrazole with 20% hydrochloric acid gives 3-aminomethyl-5-butyryloxypyrazole dihydrochloride.

The above prepared dihydrochloride salts are converted to the corresponding free bases according to the procedure described in Example 1.

EXAMPLE 6

A mixture of 21.5 g. of 3-phthalimidomethylpyrazolin-5-one (prepared as in Example 1), 20.4 g. of acetic anhydride and 75 ml. of pyridine is stirred at 75° C. for eighteen hours to give, after diluting with ice water, extracting with ether, drying and removing the ether from the extract in vacuo, 5-acetoxy-2-acetyl-3-phthalimidomethylpyrazole.

A mixture of 5 g. of 5-acetoxy-2-acetyl-3-phthalimidomethylpyrazole and 60 ml. of 10% hydrochloric acid is heated at reflux for one hour to give, after working up by cooling, filtering, evaporating the filtrate to dryness in vacuo and recrystallizing the residue from methanol-isopropyl ether, 5-acetoxy-2-acetyl-3-aminomethylpyrazole dihydrochloride.

Using 21.2 g. of butyryl chloride in place of acetic anhydride in the above procedure, 3-aminomethyl-2-butyryl-5-butyryloxypyrazole dihydrochloride is obtained.

The above prepared dihydrochloride salts are converted to the corresponding free bases by the procedure described in Example 1.

EXAMPLE 7

A mixture of 16.4 g. of ethyl 4-chloroacetoacetate, 12.9 g. of dibutylamine, 10.0 g. of pyridine and 100 ml. of benzene is stirred at room temperature for 15 minutes, then warmed on a steam bath for 20 minutes. The mixture is then extracted with dilute hydrochloric acid. The acid extract is neutralized with aqueous sodium bicarbonate. Extracting with ether, washing thoroughly with water, drying, then concentrating and distilling the extract gives ethyl 4-dibutylaminoacetoacetate.

A mixture of 12.8 g. of ethyl 4-dibutylaminoacetoacetate, 1.6 g. of hydrazine and 250 ml. of ethanol is stirred at 25° C. for 18 hours. Filtering off the solid material and washing with ether gives 3-dibutylaminomethylpyrazolin-5-one.

EXAMPLE 8

By the procedure of Example 7 using the following in place of dibutylamine:

7.1 g. of pyrrolidine
8.5 g. of piperidine
8.7 g. of morpholine the following products are obtained:

3-(N-pyrrolidinyl)methylpyrazolin-5-one
3-(N-piperidyl)methylpyrazolin-5-one
3-(N-morpholinyl)methylpyrazolin-5-one

EXAMPLE 9

A solution of 27.5 g. of ethyl phthalimidoacetoacetate in 50 ml. of dry dimethylformamide is added to a suspension of 2.4 g. sodium hydride in 100 ml. of dimethylformamide. After hydrogen evolution ceases, 13.7 g. of butyl bromide is added dropwise. The mixture is heated at 90° C. for four hours, then cooled and a large volume of water is added. The organic material is extracted with ether. The ether is removed in vacuo from the extract giving ethyl 2-(phthalimidoaceto)hexanoate.

The above prepared ethyl 2-(phthalimidoaceto)hexanoate is reacted with hydrazine according to the procedure of Example 1 to give 3-aminomethyl-4-butylpyrazolin-5-one dihydrochloride. Treating this dihydrochloride salt in methanol with sodium methoxide in methanol by the procedure described in Example 1 gives 3-aminomethyl-4-butylpyrazolin-5-one.

EXAMPLE 10

A mixture of 110 g. of α-phthalimidopropionic acid, 104 g. of phosphorus pentachloride and 1 liter of benzene is heated at reflux for two hours, then concentrated and the residue is recrystallized from hexane-benzene to give α-phthalimidopropionic acid chloride.

To 7 ml. of ethanol, 1 ml. of carbon tetrachloride and 6.25 g. of magnesium is added 40 g. of diethyl malonate in 20 ml. of ethanol over 30 minutes. Then 70 ml. more of ethanol is added and the resulting mixture is heated on a steam bath for three hours. To this mixture is added 60 g. of α-phthalimidopropionic acid chloride in 500 ml. of ether. The resulting mixture is heated at reflux for 1.5 hours and then cooled. To the mixture is added 100 ml. of 6 N sulfuric acid. The organic layer is removed, dried and concentrated to give diethyl α-phthalimidopropionylmalonate.

The above prepared diethyl α-phthalimidopropionylmalonate (75 g.) is heated in 1 liter of water to 90° C. Steam is passed in for one hour. Cooling, extracting with ether, then drying and removing the ether from the extract in vacuo gives ethyl α-phthalimidopropionylacetate.

A suspension of 28.9 g. of ethyl α-phthalimidopropionylacetate in 500 ml. of ethanol is stirred at 25° C. with 3.2 ml. of 97% hydrazine for 18 hours. Filtering and washing the solid material with ether gives 3-(1-phthalimidoethyl)pyrazolin-5-one. Refluxing with hydrochloric acid and working up by the procedure of Example 1 gives 3-(1-aminoethyl)pyrazolin-5-one dihydrochloride.

The above prepared dihydrochloride salt in methanol is treated with sodium methoxide in methanol to give 3-(1-aminoethyl)pyrazolin-5-one.

EXAMPLE 11

By the procedure of Example 10, using N-acetylglycine in place of α-phthalimidopropionic acid, ethyl acetamidoacetylacetate is obtained.

A suspension of ethyl acetamidoacetylacetate in ethanol is stirred with an equivalent amount of hydrazine in ethanol for 18 hours at 25° C. Filtering and washing the solid material with ether gives 3 - acetamidomethylpyrazolin-5-one.

By the same procedure, using the following in place of N-acetylglycine:

N-butyrylglycine
N-benzoylglycine
N-carbamoylglycine the products are:

3-butyramidomethylpyrazolin-5-one
3-benzamidomethylpyrazolin-5-one
3-ureidomethylpyrazolin-5-one.

Similarly, using in the above procedure N-(dimethylcarbamoyl)glycine, N - (dibutylcarbamoyl)glycine, N-(methylcarbamoyl)glycine and N - (butylcarbamoyl)glycine (each prepared from the corresponding ethyl esters by dissolving in ethanol, adding an equimolar amount of potassium hydroxide, then heating on a steam bath for four hours, cooling, diluting with water, acidifying with hydrochloric acid and filtering) the products are:

3-[(3,3-dimethylureido)methyl]pyrazolin-5-one
3-[(3,3-dibutylureido)methyl]pyrazolin-5-one
3-[(3-methylureido)methyl]pyrazolin-5-one
3-[(3-butylureido)methyl]pyrazolin-5-one.

EXAMPLE 12

The sodium salt of 3-phthalimidomethylpyrazolin-5-one, prepared as in Example 5, is treated with an equimolar amount of methyl iodide in tetrahydrofuran at 35° C. for 12 hours to give, after diluting with a large volume of water, extracting with ether, drying and removing the ether from the extract in vacuo, 5-methoxy-3-phthalimidomethylpyrazole.

The above prepared 5-methoxy-3-phthalimidomethyl-pyrazole (4.0 g.) is heated at reflux with 20 ml. of 20% hydrochloric acid for three hours. Cooling the mixture, filtering, evaporating the filtrate to dryness in vacuo and recrystallizing the residue from methanol-isopropyl ether gives 3-aminomethyl-5-methoxypyrazole dihydrochloride.

The dihydrochloride salt is converted to the free base, 3-aminomethyl-5-methoxypyrazole, by the procedure described in Example 1.

By the same procedure, using the following in place of methyl iodide;

ethyl bromide
propyl chloride
butyl chloride the following products are obtained:

3-aminomethyl-5-ethoxypyrazole
3-aminomethyl-5-propoxypyrazole
3-aminomethyl-5-butoxypyrazole.

What is claimed is:
1. A compound selected from the formulas:

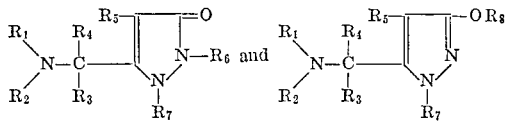

in which:
$R_1$ and $R_2$ are hydrogen or lower alkyl or, when $R_1$ is hydrogen or lower alkyl, $R_2$ is lower alkanoyl, benzoyl or

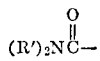

or $R_1$ and $R_2$, when taken together with the nitrogen atom to which they are attached, are N-pyrrolidinyl, N-piperidyl or N-morpholinyl;

$R_3$, $R_4$, $R_5$, $R_6$, and $R'$ are hydrogen or lower alkyl;
$R_7$ is hydrogen, lower alkyl or lower alkanoyl; and
$R_8$ is hydrogen or nontoxic, pharmaceutically acceptable, acid addition salts thereof.

2. A compound according to claim 1 in which $R_1$, $R_2$, $R_3$, $R_4$, $R_5$, $R_6$, $R_7$ and $R_8$ are hydrogen.

References Cited

Bradshaw et al., J. Chem. Soc. (London), vol. 107, p. 807 relied on (1915).

Gagnon et al., Chem. Abst., vol. 47, column 6940 (1953).

Gault et al., Coptes Rendus, vol. 150, pp. 1123-5 (1910).

Graham et al., J. Amer. Chem., Soc., vol. 71, pp. 983-8 (1949).

Kurihara et al., Chem. Abst., vol. 58, column 7921 (1963).

Pathak et al., Chem. Abst., vol. 44, columns 3212-3 (1950).

Zee-Cheng et al., J. Org. Chem., vol. 33, pp. 792-4 (February 1968).

NATALIE TROUSOF, Primary Examiner

U.S. Cl. X.R.

260—247.2 B, 247.5 R, 254, 256, 294.3 A, 294.3 E, 294.7 G, 310 R, 311, 326 A, 326.3, 482 R, 999

PO-1050
(5/69)

UNITED STATES PATENT OFFICE
CERTIFICATE OF CORRECTION

Patent No. 3,637,737          Dated January 25, 1972

Inventor(s) Bernard Loev

It is certified that error appears in the above-identified patent and that said Letters Patent are hereby corrected as shown below:

Column 1, line 23, above the left-hand formula insert --- FORMULA I --- and above the right-hand formula insert --- FORMULA II --- .

Column 1, line 62, "FORMULA III" should appear above the right-hand formula in lines 67 to 71.

Column 1, lines 67 to 71, that portion of the formula reading

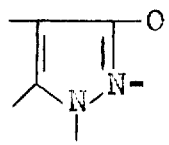　　should read　　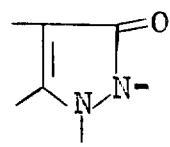 .

Signed and sealed this 20th day of June 1972.

(SEAL)
Attest:

WARD M. FLETCHER, JR.          ROBERT GOTTSCHALK
Attesting Officer               Commissioner of Patents